United States Patent [19]

Baker

[11] Patent Number: 4,697,081

[45] Date of Patent: Sep. 29, 1987

[54] INFRA-RED RADIATION DETECTOR DEVICES

[75] Inventor: Geoffrey Baker, Southampton, England

[73] Assignee: U.S. Philips Corp., New York, N.Y.

[21] Appl. No.: 824,031

[22] Filed: Jan. 30, 1986

[30] Foreign Application Priority Data

Feb. 8, 1985 [GB] United Kingdom ............... 8503240

[51] Int. Cl.$^4$ .................................................. G01J 1/00
[52] U.S. Cl. ............................................. 250/338; 250/342
[58] Field of Search ............ 250/338 PY, 338 R, 342, 250/349; 340/567; 374/121, 178

[56] References Cited

U.S. PATENT DOCUMENTS

| 3,896,311 | 7/1975 | Taylor et al. | 250/338 PY |
| 4,336,452 | 6/1982 | Baker | 250/338 |
| 4,379,971 | 4/1983 | Smith et al. | 250/338 PY |
| 4,556,796 | 12/1985 | Renals | 250/338 PY |
| 4,575,633 | 3/1986 | Baker et al. | 250/338 |

FOREIGN PATENT DOCUMENTS 1377891 12/1974 United Kingdom .
1504283 3/1978 United Kingdom .
1580403 12/1980 United Kingdom .
1588222 4/1981 United Kingdom .

Primary Examiner—Janice A. Howell
Attorney, Agent, or Firm—Marc D. Schechter

[57] ABSTRACT

An infrared radiation detector device, for example, for an intruder alarm, comprises two dual detectors. Each dual detector constitutes a separate detection channel and has two pyroelectric detector elements. The detector elements are formed from pyroelectric material with electrodes on opposite surfaces. The detector elements of each dual detector are spaced apart from one another and connected in a circuit differentially to cancel out the effects of temperature changes common to both elements. One detector element of one dual detector is interdigitated with a respective detector element of the other dual detector, thus enabling the two dual detectors to respond to incoming radiation and provide outputs at, or very nearly at, the same time. In this way, when used in an intruder alarm, the risk of false triggering is reduced. The other detector elements of the dual detectors may similarly also be interdigitated.

11 Claims, 6 Drawing Figures

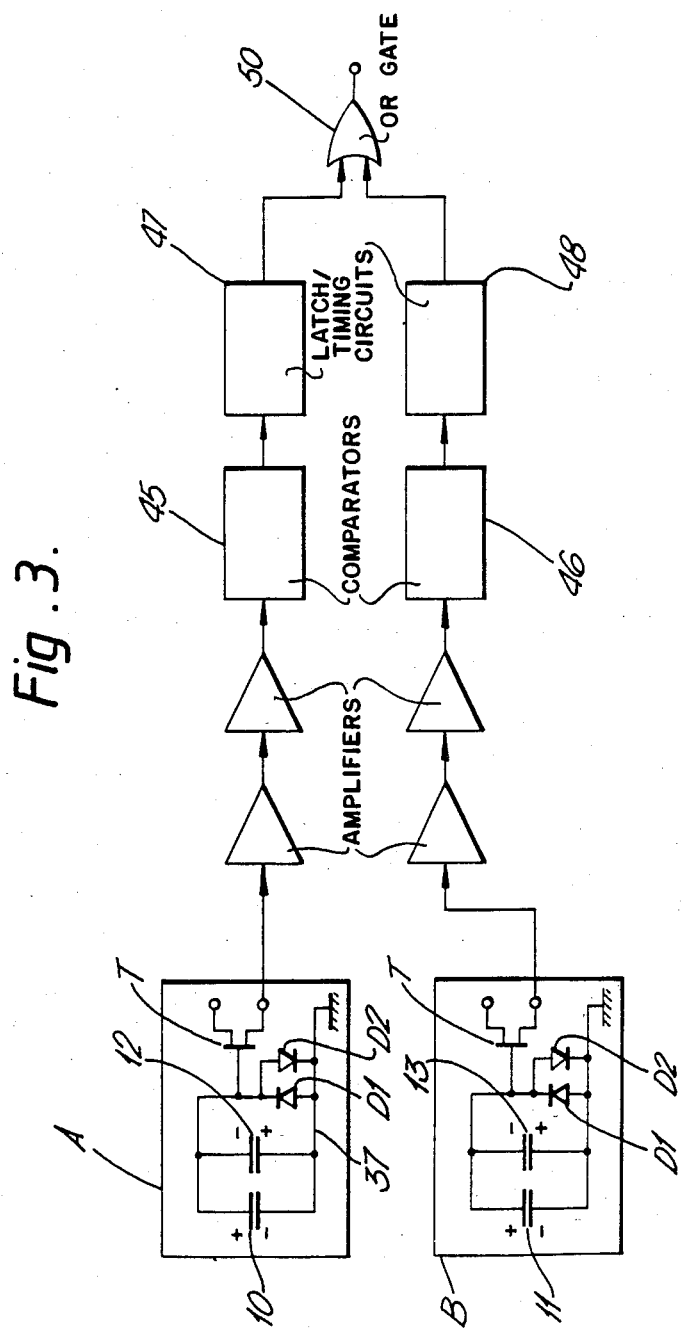

INFRA-RED RADIATION DETECTOR DEVICES

BACKGROUND OF THE INVENTION

The invention relates to infrared radiation detector devices and in particular to pyroelectric infrared radiation detector devices.

The use of pyroelectric material for infrared radiation detection is well established. Pyroelectric material is employed in detector devices by making a body of the material into a capacitor with electrodes on oppositely located plane surfaces perpendicular to the direction of polarization of the material. When the material suffers a temperature change, for example, as a result of infrared radiation incident thereon, the electrical polarization in the material changes. The redistribution of compensating charges on the surface of the material produced thereby causes a current to flow in a circuit in which the capacitor is connected.

Pyroelectric infrared radiation detector devices are used in a variety of applications. Their characteristics make them particularly attractive for application in remote switching systems, intruder detection systems and in movement sensing generally. In such applications, the detector device responds to a moving object by detecting the flux change produced in passing through the device's field of view. In the case of the object being a person, the infrared radiation emitted by the moving person or body part is converted by the detection device into an electronic signal which can be used to actuate an alarm or to switch lights on and off.

Various pyroelectric materials have been employed for such purposes. These materials include triglycine sulphate, modified lead zirconate titanate, lithium tantalate and certain plastic film materials such as polyvinylidene fluoride. Polarization is normally achieved in such materials by applying an electric field in the direction of the polar axis, sometimes while simultaneously subjecting the material to an elevated temperature, so as to align the electric dipoles. In some materials, for example, L-alanine doped triglycine sulphate, it is not necessary to induce polarization as this exists already.

It is possible to use in, for example, an intruder detection system, a detector device comprising a single detector element of pyroelectric material. However, for the purpose of detecting small movements across the total field of view of the detector device an increased sensitivity can be obtained when the device comprises two, or more, detector elements. Advantageously, such an arrangement can be used to provide some immunity from undesired signals caused by variations in ambient temperature and background radiation by connecting the two pyroelectric elements differentially. In one configuration, the device is constructed so that uniform changes in input radiation in the fields of view of both elements, for example changes in background radiation, will produce voltages across the pair of elements which are in opposition and therefore no net signal voltage is created, whereas a change of input radiation in the field of view of just one element can produce a differential output signal.

One such known radiation detector device comprises a pair of detector elements arranged in a common plane and each formed of a body or body part of polarized pyroelectric material. The elements each have electrodes on opposite major surfaces in overlapping relationship, and the electrodes extend generally normal to the polarization direction. The elements within the device are electrically connected via their electrodes to form two series connected capacitor detectors in which the directions of polarization of the pyroelectric material are in opposition. Such detector devices are commonly referred to as "Dual" detector devices.

In an alternative known form of Dual detector device, the two detector elements may instead be connected in parallel, but still with opposite polarities. This arrangement has the advantage that it usually provides a better signal to noise ratio than the aforementioned series-opposed arrangement. As in the series-opposed arrangement a common single body of pyroelectric material may be used.

Dual detector devices are highly suitable for use in intruder detection systems. One important advantage is that fluctuations in the thermal state of the background produce no output signal from the device. In single element detector devices, such fluctuations produce a noise-like signal which can result in false alarms.

To ensure a well focussed image, which is highly desirable for a dual detector device, and an acceptable operating range, the infrared radiation is usually focussed by an optical system. This can be in the form of a molded plastic mirror having a number of facets with coincident foci. The mirror being constructed such that the detector device can be mounted at the focus without obscuring the field of view. As an intruder, for example, moves across the field of view of the mirror, a corresponding number of separate images will be focussed onto each element of the device individually, ensuring multiple triggering signals. Alternatively a Fresnel lens array may be used.

The detector devices normally include an impedance converting amplifier, typically a n-channel field effect transistor (FET) whose gate is connected to, for example, the series connected detector elements, and a non-linear network which protects the gate of the FET from excessive voltages and progressively limits the pyroelectric voltage resulting from large changes in ambient temperature so as to prevent overloading.

While these dual detector devices perform reasonably well, (with the two detector elements serving to reduce false triggering instances resulting from changes in ambient temperature, background temperature and acoustic noise), they are not wholly immune to false triggering. Thermal and electronic noise within the pyroelectric elements and their associated circuitry can still give rise to false triggering. Random noise spikes can occur from time to time which are of a magnitude sufficient to produce an output signal from the detector device and its associated circuitry.

Attempts have been made to alleviate this problem. Thus, in an intruder detection system for example, it is known to provide an alarm generating circuit which is designed to respond to at least two output signals from the detector device within a given time period. Since false triggering due to random noise spikes occurs fairly infrequently, the likelihood of two such triggering signals occuring within the given time period is remote. However, the necessity for the system to produce at least two triggering signals before generating an alarm can, in some circumstances, impair the effectiveness of the system in detecting intruders and for this reason the system is not considered to be entirely satisfactory.

In another known arrangement, a so-called two channel detector, the detector device effectively comprises two dual detectors each having two, spaced, pyroelectric detector elements comprising pyroelectric material and electrodes on opposite surfaces thereof. The two pyroelectric detector elements of each dual detector are connected in a circuit differentially so as to obtain therefrom an output dependent on temperature differences between the two detector elements.

In the known arrangement, the four pyroelectric elements of the two dual detectors are spaced from one another in a linear array, with the first and third elements of the array being connected together to form one dual detector, and the second and fourth elements being similarly connected together to form the second dual detector. The outputs from the two dual detectors are monitored, and an alarm signal is generated in response to signals provided by both detectors.

A signal from one of the detectors by itself as a consequence, for example, of a noise spike rather than an intruder will not result in an alarm output. The chance of noise spikes occuring simultaneously in both dual detectors and causing an alarm output is small.

While this arrangement might seem therefore a satisfactory solution to the problem of false triggering, it is not without disadvantages. In use, the image of an intruder will traverse the elements from one side to the other of the array. Thus the image will move across onto the first element of the first dual detector, producing as a result a signal, and then across the gap between that element and the first element of the second dual detector, this being the next in the series array, before falling on this second detector element to produce a second signal.

The time taken by the image to traverse the elements of both dual detectors in this manner can cause difficulties. As the signals from both dual detectors will not be coincident, it is necessary to initiate a timing period or window, typically in the order of several seconds, following the occurrence of a signal from one of the dual detectors in which a signal from the second dual detector is expected to be received. If a signal from the second dual detector occurs during that predefined time period, the system responds accordingly to provide an alarm. If, on the other hand, a signal is not received from the second dual detector during that time period, the system assumes the signal from the first dual detector to be a spurious signal, caused for example by a noise spike, and resets itself, thus effectively ignoring that first signal.

This timing period can lead to difficulties in operation. The timing period must be of sufficient duration to allow for the image of the intruder to pass from a detector element of the first dual detector to a detector element of the second dual detector. If the timing period selected is too short, there is risk that the delay between the times the image of an intruder falls on respective adjacent elements of the dual detectors would be greater than the timing period, with the result that the intruder is not detected by the system. If the timing period is unduly long, there is a very real risk of false operation of the system since non-intruder related noise spikes could still occur in both channels during that timing period leading to the false triggering. It will be seen therefore that the detecting efficiency of this system could, in certain circumstances, be impaired.

SUMMARY OF THE INVENTION

The present invention relates to an infrared radiation detector device of this so-called two channel detector kind. Such a detector comprises two dual detectors each having two, spaced, pyroelectric detector elements. Each detector element comprises pyroelectric material and electrodes on opposite surfaces thereof. The two pyroelectric detector elements of each dual detector are connected in a circuit differentially so as to obtain therefrom an output dependent on temperature differences between the two pyroelectric detector elements.

According to the present invention, in such a detector device one pyroelectric detector element of one of the two dual detectors is interdigitated with one pyroelectric detector element of the other dual detector.

This detector device therefore shares the advantages normally associated with dual detectors in that the device is rendered insensitive to environmental effects, such as variations in temperature and in background radiation, and acoustic noise. Being also a two channel device, it shares similar advantages to those offered by the aforementioned two channel detector. Thus, when incorporated in, for example, an intruder detection system in which output signals from both channels, that is (both dual detector circuits) indicative of an intruder traversing the field of view of the system are required in order for an alarm to be activated, the risk of false alarm triggering as a result of spurious noise spikes occuring in one of the channels is reduced.

More importantly however, by interdigitating one pyroelectric element of each of the two dual to detector, the device has the further advantage that the two dual detectors respond substantially simultaneously. For example, in an intruder detection system with the interdigitated detector elements suitably arranged in accordance with the path of travel and size of the intruder image directed onto the device, an image of an intruder traversing the dual detectors and incident upon those interdigitated elements will cause the elements to respond substantially simultaneously. That is, the elements will respond at or very nearly at the same time, and an output signal will be produced by both channels accordingly. This reduces the risk of false triggering even further.

Although it may be necessary to define a timing window in which to allow for slight delays between the occurence of signals in the two channels, the interdigitating of the detector elements in accordance with the invention means that only a very short timing period need be defined. Typically the timing period need be on the order of a fraction of a second, in contrast to the comparatively long timing period necessary in the known two channel detector. The timing period required is therefore minimized, and since the likelihood of spurious noise spikes occurring in both channels in a given timing period decreases with decreases in the duration of the timing period, the risk of false triggering within the system is thereby considerably reduced.

Preferably, the other pyroelectric detector elements of the two dual detectors are also interdigitated with one another in a similar manner. In this way, the device can respond to incoming radiation emanating from, for example, an intruder whose image traverses the device from either side.

To simplify construction, each pair of interdigitated detector elements may comprise a single body of pyroelectric material having respective first electrodes of each of the elements disposed on a first surface of the pyroelectric material. The electrodes are shaped so as to define interdigitations. Electrode material constituting second electrodes of the detector elements, for example in the form of a common electrode layer, is disposed on an opposite surface of the pyroelectric material in overlying relationship with the first electrodes.

In order to help ensure that each pair of interdigitated elements respond substantially simultaneously to radiation to be detected, the interdigitations of the interdigitated elements may be arranged in a linear array so as to extend parallel to one another, corresponding to the expected direction of the path of travel of that radiation, and may be of substantially equal area.

If one form of the device, the interdigitations, as defined by the respective first electrodes, are of rectangular shape. The interdigitations of each interdigitated element are connected together by connecting portions to one side. In an alternative form, the interdigitations of each of the interdigitated elements may be triangular in shape and may be interconnected by connecting portions to one side thereof, for example extending between their apexes, with the interdigitations of the elements being arranged in dovetail fashion. In yet another form, the interdigitations may each comprise a neck portion leading to an enlarged head portion. The detector elements are arranged facing one another with the enlarged head portions of the interdigitations of one detector element disposed adjacent neck portions of the other detector element, and the neck portions of each detector element being interconnected by connecting portions to one side of the element.

It will be appreciated that with all these alternative electrode configurations, the respective interdigitations of the detector elements in effect share a common area so that they are likely to respond substantially simultaneously to radiation falling thereon. Furthermore, the shapes of the interdigitations, and hence the surface areas presented to incoming radiation by the respective pyroelectric detector elements defined thereby, are chosen such that, as incident radiation to be detected traverses the associated electrodes, the elements respond as near equal as possible.

BRIEF DESCRIPTION OF THE DRAWING

FIG. 3 shows an example of a circuit arrangement for the dual detectors of FIGS. 1 and 2.

DESCRIPTION OF THE PREFERRED EMBODIMENTS

Figure 1:
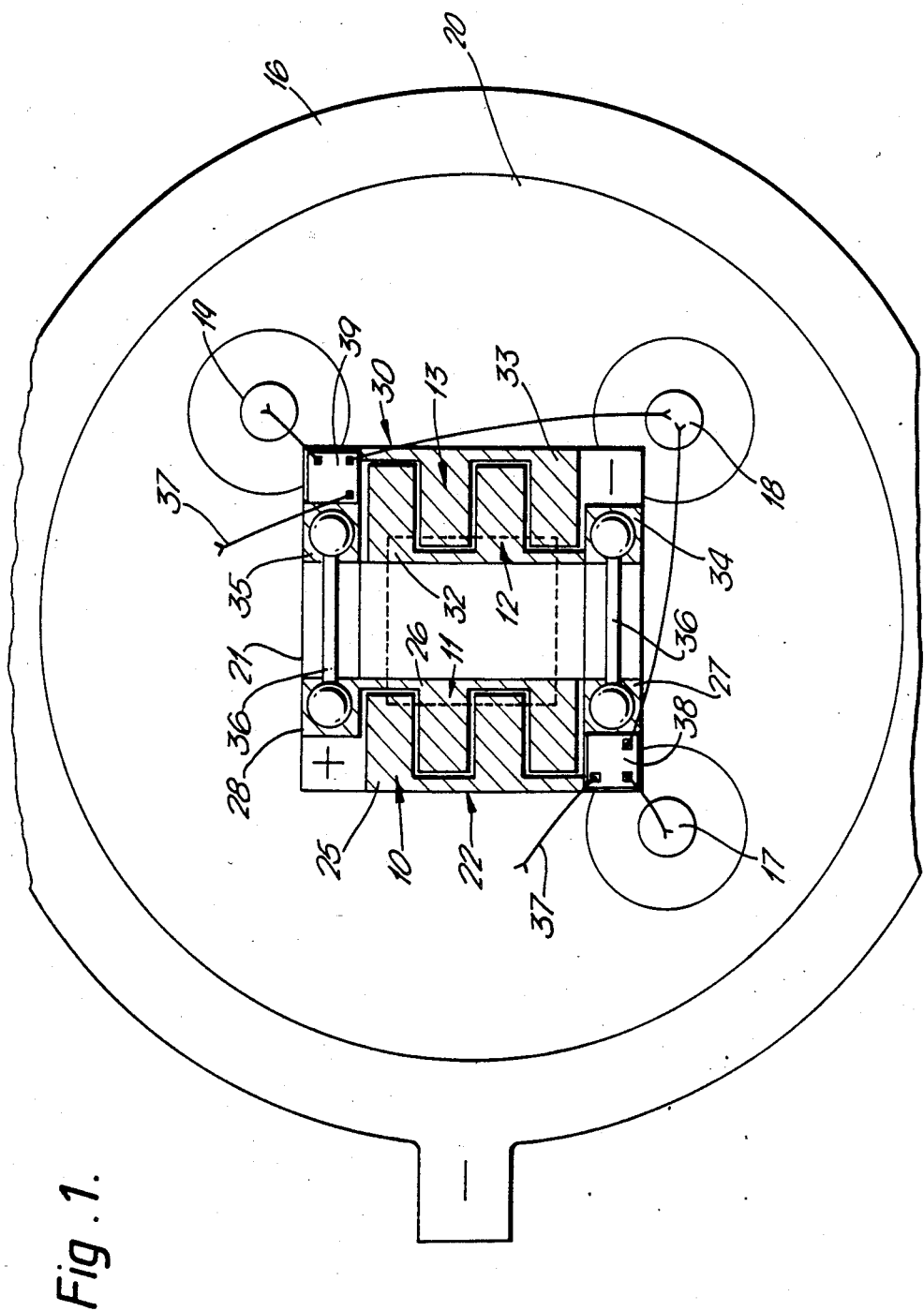
FIGS. 1 and 2 are plan and side views respectively of the detector device showing the pyroelectric detector elements of the two dual detectors and their associated circuitry.
Figure 2:
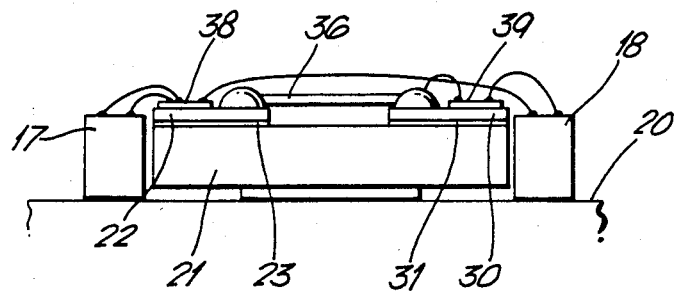

Referring now to FIGS. 1 and 2, the infrared radiation detection device is a two channel arrangement. Each channel comprise a dual detector constituted by a respective pair of spaced pyroelectric detector elements. The pyroelectric detector elements are designated generally in the Figures by the reference numerals 10, 11, 12 and 13. One dual detector comprises the elements 10 and 12, and the other dual detector comprises elements 11 and 13.

The detector elements are housed, together with associated circuitry, in an envelope having a four lead header 16 of TO-5 configuration as commonly used in the semiconductor industry in which the leads 17, 18 and 19 extend as conductive posts through, and insulated from, the main metal part 20 of the header, and the fourth lead (not visible) is connected to the header part 20 to enable a ground connection to be made with that part. A generally square-shaped plinth 21 of insulative material, for example high density alumina, and having an electrically conductive coating on its surfaces, is mounted on the upper surface of the header part 20 via an intermediate member. Plinth 21 carries on its upper surface the detector elements 10 to 13. The elements 10 to 13 are secured to the plinth 21 by means of conductive epoxy resin.

The pyroelectric elements 10 and 11 are formed from a single, rectangular body 22 of pyroelectric ceramic material such as lanthanum and manganese doped lead zirconate titanate. For further information about this material, reference is made to U.K. Pat. No. 1,504,283. The pyroelectric body 22 has a thickness of around 150 microns and major surfaces of approximately $3.0 \times 1.0$ mm. On the lower, major, surface of the body 22, adjacent the plinth 21, there is disposed an electrode 23 of nichrome which extends completely over the underside of the body 22. Portions of this common electrode layer constitute respective lower electrodes for the detector elements 10 and 11.

On the opposite, uppermost major surface of the body 22 there are defined, using conventional photolithographic techniques, two further electrodes 25 and 26 of a material, such as michrome, transmissive to infrared radiation which is to be detected. Each of the electrodes 25 and 26 comprises a number, in the particular case illustrated two, of spaced, rectangular fingers arranged in a linear array interconnected at one side by relatively slender connecting portions.

The electrodes 25 and 26 are arranged facing one another such that their respective fingers, which extend parallel to one another and are of approximately equal area, are interdigitated as shown in FIG. 1 with each finger of one electrode extending alongside at least one finger of the other electrode. It will be appreciated that the electrodes 25 and 26 may comprise more than two interdigitated fingers if desired, for example three or five. A small gap physically separates the two electrodes. In the embodiment illustrated in FIG. 1, this gap has a width of around 0.05 mm. The fingers are each approximately 0.85 mm long by 0.40 mm wide, and the widths of the connecting portions between adjacent fingers are around 0.10 mm.

At opposing ends of the electrodes 25 and 26 there are provided terminal areas 27 and 28, respectively.

The electrodes 25 and 26 serve to define respectively, the detector elements 10 and 11. More particularly, the shapes of the electrodes 25 and 26 define the shapes of the respective elements 10 and 11 with, for example, the element 10 comprising the electrode 25 and those portions of the body 22 and the common rear electrode 23 which lie directly under, and correspond in shape with, the electrode 25. Thus, although formed from a single body of pyroelectric material and having a common rear electrode, the detector elements 10 and 11 are separate, interdigitated elements corresponding in shape to the electrodes 25 and 26 respectively whose rear electrodes are interconnected by intermediate portions of the common electrode 23.

The pyroelectric detector elements 12 and 13 are formed in an identical manner. Thus the elements 12 and 13 are formed from a single body 30 of pyroelectric material, such as lanthanum and manganese doped lead zirconate titanate, with a common rear electrode 31 of nichrome, and respective upper electrodes 32 and 33 of material transparent to infrared radiation having respective interdigitated fingers and terminal areas 34 and 35.

The detector elements 12 and 13 are secured on the plinth 21 by means of conductive epoxy parallel to the elements 10 and 11, with the fingers of the elements 10 to 13 all extending in the same direction, and spaced therefrom by approximately 1 mm. The rear electrodes 23 and 31 are thus electrically connected together and to the header part 20 via the conductive coating on the plinth 21.

The pairs of elements 10 and 12, and 11 and 13, constituting respectively the two dual detectors, are interconnected by conductive bridges 36 joined by conductive expoxy to the terminal areas 27, 34 and 28, 35 of the element electrodes. The pyroelectric material of the elements has previously been poled in a known manner by heating the material to slightly above the transition temperature of the material, around 135° C., and applying an electric field of approximately 20 kVcm$^{-1}$ across the material. The application of the electric field is such that polarization achieved in the detector elements 10 and 11 is in one direction whereas polarization of the elements 12 and 13 is in the opposite direction.

The circuits of the two dual detectors of the device are shown to the left in FIG. 3 and are referenced as A and B. The pyroelectric detector elements 10, 11, 12 and 13, are represented, as is conventional, as capacitors. The circuit of each dual detector includes, in addition to its respective two detector elements, a field effect transistor (FET) T, and a pair of diodes D1 and D2 in parallel opposition.

The detector elements in each circuit are connected in parallel opposition between a lead 37, which, in turn, is connected to a point of reference potential, and the gate of the FET. The diodes, D1 and D2, are also connected between the gate of the FET and the lead 37. For a more detailed description of this circuit, reference is made to U.K. Pat. No. 1,580,403.

Briefly, it can be said that the diode arrangement provides a biasing gate leakage path for the FET. The diode arrangement protects the gate of the FET, which acts as an amplifier and forms part of an impedance matching circuit, from excessive voltage excursions and limits progressively the pyroelectric voltage resulting from large changes in ambient temperature.

The above described diode and FET circuit for each dual detector is conveniently in the form of a three terminal chip. Referring again to FIGS. 1 and 2, the two chips, referred at 38 and 39, are shown secured to the upper surface of elements 10 and 13, respectively, adjacent to terminal areas 27 and 35 thereof. The chip 38 is part of the first dual detector circuit comprising elements 10 and 12. The chip 39 is part of the second dual detector circuit comprising elements 11 and 13. The lead 37, FET source and FET drain terminals of chip 38 are, respectively, connected by bonded flying leads to the header part 20, header lead 17 and header lead 18. The corresponding terminals of chip 39 are connected, respectively, to header part 20, header lead 19 and header lead 18. In an alternative arrangement, an additional header lead may be provided, with the FET drain terminal of chip 39 being connected separately to the additional header lead to enable the FETs to be used in common source amplifier configuration as well as source follower configuration.

The two dual detectors and their associated circuitry supported on the header 16 are enclosed in conventional manner by an envelope cover member (not shown in FIG. 1) in the form of a metal can. The cover member is sealed and secured to the rim of the header and has a window of multilayer coated silicon. The window allows the passage of radiation to be detected in the desired wavelength range so as to be incident on the upper surfaces of the pyroelectric detector elements.

Operation of the detection device will now be described. For this purpose it will be assumed that the device is incorporated in an intruder detection system, although it should be understood that the device could be used in a variety of other applications, such as remote control switching.

Figure 4:
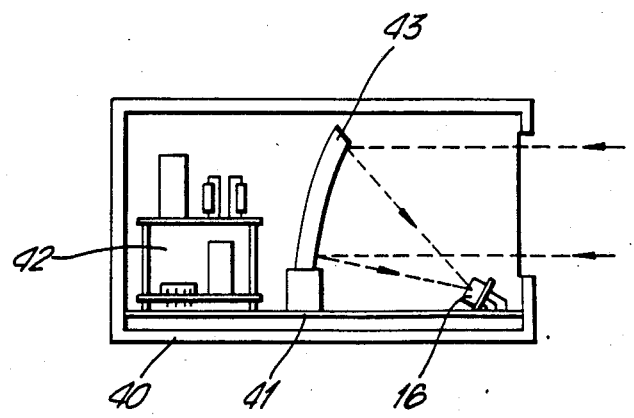
FIG. 4 shows an intruder alarm system incorporating the detector device of the present invention.

To detect an intruder within an area protected by the field of view of the system use is made of the intruder's movement to cause a change in radiation reaching the detector elements. Referring to FIG. 4, the header 16, and attached cover member, of the detector device is shown disposed at one end of an enclosure 40 with its leads soldered to a printed circuit board 41. The leads are connected therethrough to alarm circuitry 42 located at the other end of the enclosure so that any heat which may be generated by the circuitry does not impair operation of the detector device.

Incident radiation passes through a low density polyethylene window at one end of the enclosure, as indicated by the arrows in FIG. 4. The incoming radiation is reflected and focussed by a curved molded plastic mirror 43 which directs and focusses the radiation onto the pyroelectric detector elements on the header 16, through the transmissive window in the header cover member. The header 16 is located so as not to obscure the mirror's field of view.

As an intruder moves through the field of view of the system, the focussed image of the intruder moves along a generally straight line path. The header 16 is arranged such that this path of image travel extends across the detector elements 11 to 13 in a direction at right angles to the elongate direction of the elements, that is, along a horizontal line in FIG. 1. As the image moves say from the left in FIG. 1 and impinges on the detector elements 10 and 11, the two dual detectors comprising the elements 10 and 12 and 11 and 13, respectively, produce outputs signals. As the image moves further across and impinges on the detector elements 12 and 13, the dual detectors will each again produce an output signal.

The mirror 43 may instead be in the form of a multisegment mirror in which each segment has its own, discrete, field of view and is arranged to direct and focus incoming radiation in that field of view onto the detector elements. In this way, as an intruder moves through the field of view of each mirror segment, a separate image is focussed onto the elements so that a plurality of output signals are produced by the dual detectors for multiple triggering. In further alternative arrangements, one or more lenses rather than mirrors may be employed.

If the image of an intruder is always expected in just one direction, then only one interdigitated pair of elements need be provided. The other elements, for example 12 and 13, may be in the form of parallel strips.

The two detector elements 10 and 12 or 11 and 13 of the two dual detectors operate together differentially, as previously described, so as to provide immunity from common mode radiation signals such as those generated by variations in ambient temperature, background radiation, and acoustic noise.

By virtue of the fact that the detector elements 10 and 11 are interdigitated their upper surfaces, as defined by the electrodes 25 and 26, occupy substantially the same, relatively small, common area (i.e. their overall borders are very nearly coincident.) Thus, and also bearing in mind that the dimensions of the interdigitations are appropriately chosen in relation to the expected size of the radiation image, or vice versa, an image of an intruder moving from, say, the left in FIG. 1 will cause the two detector elements 10 and 11 to respond substantially simultaneously. Moreover, because of their particular surface shapes and the manner in which they are interdigitated, the respective areas they present to incoming radiation, are very similar so that they respond to that radiation by approximately equal amounts. Hence, the two dual detectors in which they are contained will, in response to an image focussed thereon, produce approximately equal output signals substantially simultaneously.

The same applies to the detector elements 12 and 13. As the focussed image passes from the elements 10 and 11, across the gap between the elements 11 and 12, and onto the elements 12 and 13 (or alternatively passes from the right in FIG. 1 on the elements 12 and 13) the elements 12 and 13 will respond substantially simultaneously and by approximately equal amounts. Consequently the output signals from the two dual detectors are again substantially equal and simultaneous.

Referring now again to FIG. 3, there is shown to the right of the dual detectors A and B one example of a circuit for responding to the outputs of the two dual detectors suitable for use in an intruder detector system. The outputs of the dual detectors A and B, constituting in effect two channels, are each amplified and conditioned by two series-connected amplifiers. The amplified outputs are fed to a respective signal level threshold window comparator circuit, 45 or 46, which provides an output signal (a logic high) if the amplified signal from the associated dual detector is of a predetermined magnitude, indicative of an intruder rather than mere internal or extraneous noise.

If it could be guaranteed that the two dual detectors A and B respond simultaneously to an intruder image to produce simultaneous output signals, the outputs from the circuits 45 and 46 may simply be fed to an AND gate, for example, so as to provide an alarm generating output signal therefrom in response to coincidental outputs from the dual detectors A and B. However, it is recognized that this might not happen and that there could be a slight delay between signals from A and B.

For this reason the circuit includes signal latch and timing circuits 47 and 48 for each channel connected to the outputs of circuits 45 and 46. The latch and timing circuits 47 and 48 normally provide a high (1) output and are triggered by their inputs going low (0) to provide a low output for a preset time duration. The outputs of the latch and timing circuits 47 and 48 are connected to an OR gate 50 whose output is, in turn, fed to an alarm generating circuit.

The output of OR gate 50 is normally high but switches to low in response to simultaneously high outputs from comparators 45 and 46 or staggered outputs occurring within the interval preset by circuits 47 and 48 to cause triggering of an alarm. Thus, the circuit responds to coincident or near coincident outputs from both dual detectors A and B. An output from the dual detector of one channel alone would not generate an alarm.

The intervals defined by circuits 48 and 49 are typically of a fraction of a second duration. This is sufficient to allow for the slight time delay which occurs in the outputs of the dual detectors A and B in response to the image of an intruder traversing the detector device and falling on the respective detector elements 10 and 11.

It will be appreciated that in view of the nature of the interdigitated detector elements of the two dual detectors as described previously, and more particularly their shape, size and relative disposition with respect to the expected size and path of travel of an intruder image, any delay between the outputs of the dual detectors A and B will be minimal. Therefore, only a very short timing period need be defined, in contrast to the comparatively long duration of the timing period necessary in the aforementioned known arrangement. The possibility of non-intruder-related noise signals of sufficient magnitude to generate outputs from the dual detectors occuring in both channels within that short time period is small, and hence the likelihood of false triggering is consequently greatly reduced.

When used in a remote switching system, the detector device operates in the same general manner except that of course the system's circuitry responds to operate switch means, for example a lighting control switch, rather than to activate an alarm.

Figure 5A:
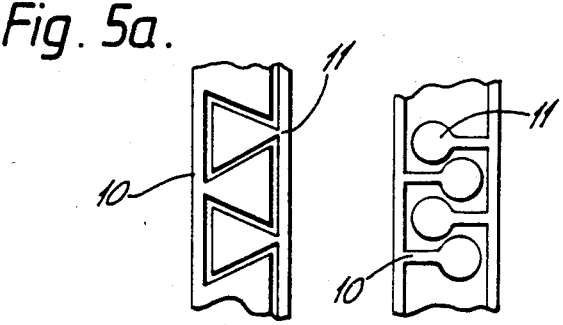
FIGS. 5a and 5b illustrate alternative forms of detector elements.

In alternative forms of the device, different configurations of interdigitated detector elements may be employed. For example, referring to FIG. 5a, there is shown a configuration in which detector elements 10 and 11, and similarly the elements 12 and 13, as defined by their top electrodes, each comprise a linear array of triangular portions connected by relatively slender connecting portions extending between the apexes of the triangular portions. The respective triangular portions of the elements are interdigitated in dovetail fashion.

Figure 5B:
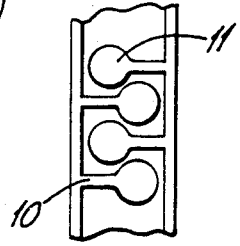

As shown in FIG. 5b, the elements may instead comprise interdigitated bulbous portions attached via a stem to a relatively slender connecting strip extending along one side.

Although the described embodiment refers to the use of modified lead zirconate titanate, in particular, for the detector elements, other pyroelectric materials may instead be used.

I claim:

1. An infrared radiation detector device comprising:
   a first dual detector having first and second pyroelectric detector elements spaced from each other, each pyroelectric detector element producing an individual output signal and comprising a pyroelectric material having opposite surfaces with electrodes on the opposite surfaces, the first and second pyroelectric detector elements being electrically connected to each other to produce a detector output signal which is the difference between the individual output signals; and
   a second dual detector having third and fourth pyroelectric detector elements spaced from each other, each pyroelectric detector element producing an individual output signal and comprising a pyroelectric material having opposite surfaces with electrodes on the opposite surfaces, the third and fourth pyroelectric detector elements being electrically connected to each other to produce a detector output signal which is the difference between the individual output signals;
   characterized in that the first pyroelectric detector element of the first dual detector is interdigitated with the third pyroelectric detector element of the second dual detector.

2. An infrared radiation detector device as claimed in claim 1, characterized in that the second pyroelectric detector element of the first dual detector is interdigitated with the fourth pyroelectric detector element of the second dual detector.

3. An infrared radiation detector device as claimed in claim 2, characterized in that each pair of interdigitated pyroelectric detector elements comprises:

a single body of pyroelectric material having first and second opposite surfaces;

two interdigitated electrodes on the first surface; and electrodes on the second surface opposite both interdigitated electrodes.

4. An infrared radiation detector device as claimed in claim 3, characterized in that the electrodes on the second surface are formed of a single electrode.

5. An infrared radiation detector device as claimed in claim 3, characterized in that the digits of the interdigitated detector elements are arranged in a linear array, are substantially parallel to one another, and are of substantially equal area.

6. An infrared radiation detector device as claimed in claim 5, characterized in that the digits of the interdigitated detector elements are rectangular.

7. An infrared radiation detector device as claimed in claim 5, characterized in that the digits of the interdigitated detector elements are triangular and are arranged in a dovetail fashion.

8. An infrared radiation detector device as claimed in claim 5, characterized in that the digits of the interdigitated detector elements are circular with narrow stems.

9. An infrared radiation detector device as claimed in claim 1, characterized in that:

the pyroelectric detector elements of the first dual detector are electrically connected to each other in parallel with opposite pyroelectric polarity; and the pyroelectric detector elements of the second dual detector are electrically connected to each other in parallel with opposite pyroelectric polarity.

10. An infrared radiation detector device comprising:

a first dual detector having first and second pyroelectric detector elements spaced from each other, each pyroelectric detector element producing an individual output signal and comprising a pyroelectric material having opposite surfaces with electrodes on the opposite surfaces, the first and second pyroelectric detector elements being electrically connected to each other to produce a detector output signal which is the difference between the individual output signals; and a second dual detector having third and fourth pyroelectric detector elements spaced from each other, each pyroelectric detector element producing an individual output signal and comprising a pyroelectric material having opposite surfaces with electrodes on the opposite surfaces, the third and fourth pyroelectric detector elements being electrically connected to each other to produce a detector output signal which is the difference between the individual output signals;

characterized in that the surface pyroelectric detector element of the first dual detector is interdigitated with the third pyroelectric detector element of the second dual detector; and the first pyroelectric detector element is spaced from the third pyroelectric detector element by an amount less than the spacing between the first pyroelectric detector element and the second pyroelectric detector element.

11. An infrared radiation detector device comprising:

a first dual detector having first and second pyroelectric detector elements spaced from each other, each pyroelectric detector element producing an individual output signal and comprising a pyroelectric material having opposite surfaces with electrodes on the opposite surfaces, the first and second pyroelectric detector elements being electrically connected to each other to produce a detector output signal which is the difference between the individual output signals; and a second dual detector having third and fourth pyroelectric detector elements spaced from each other, each pyroelectric detector element producing an individual output signal and comprising a pyroelectric material having opposite surfaces with electrodes on the opposite surfaces, the third and fourth pyroelectric detector elements being electrically connected to each other to produce a detector output signal which is the difference between the individual output signals;

characterized in that the first pyroelectric detector element of the first dual detector is interdigitated with the third pyroelectric detector element of the second dual detector;

the digits of the interdigitated detector elements are arranged in a linear array along a first direction; and the first and second pyroelectric detector elements are spaced in a direction traverse to the first direction.

* * * * *

UNITED STATES PATENT AND TRADEMARK OFFICE
CERTIFICATE OF CORRECTION

PATENT NO. : 4,697,081

DATED : September 29, 1987

INVENTOR(S) : GEOFFREY BAKER

It is certified that error appears in the above-identified patent and that said Letters Patent is hereby corrected as shown below:

Claim 10, line 21 (column 12, line 11), "surface" should read --first--

Claim 11, line 30 (column 12, line 49), "traverse" should read --transverse--

Signed and Sealed this

Twenty-third Day of February, 1988

Attest:

DONALD J. QUIGG

Attesting Officer

Commissioner of Patents and Trademarks